(12) United States Patent
Sharif et al.

(10) Patent No.: US 10,769,132 B1
(45) Date of Patent: Sep. 8, 2020

(54) EFFICIENT STORAGE AND RETRIEVAL OF TIME SERIES DATA

(71) Applicant: Juniper Networks, Inc., Sunnyvale, CA (US)

(72) Inventors: Rahamath Sharif, Bangalore (IN); Chandrasekhar A, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 220 days.

(21) Appl. No.: 15/839,463

(22) Filed: Dec. 12, 2017

(51) Int. Cl.
*G06F 17/30* (2006.01)
*G06F 16/23* (2019.01)
*H04L 12/26* (2006.01)
*G06F 16/27* (2019.01)
*G06F 16/21* (2019.01)

(52) U.S. Cl.
CPC ........ *G06F 16/2365* (2019.01); *G06F 16/219* (2019.01); *G06F 16/23* (2019.01); *G06F 16/27* (2019.01); *H04L 43/04* (2013.01)

(58) Field of Classification Search
CPC ...... G06F 7/00; G06F 16/00; G06F 16/24568; G06F 16/9027; G06F 16/2246; G06F 16/2255
See application file for complete search history.

(56) References Cited

U.S. PATENT DOCUMENTS

| 6,029,170 | A | 2/2000 | Garger et al. |
| 6,182,249 | B1* | 1/2001 | Wookey .............. G06F 11/3461 714/37 |
| 6,321,230 | B1* | 11/2001 | Joslin ..................... G06Q 10/06 |
| 9,143,393 | B1 | 9/2015 | Bird et al. |
| 9,661,063 | B2* | 5/2017 | Robertson ......... H04L 29/12009 |
| 2007/0091797 | A1* | 4/2007 | Ma ........................ H04L 47/621 370/229 |
| 2009/0228474 | A1 | 9/2009 | Chiu et al. |
| 2012/0072456 | A1* | 3/2012 | Dube ................ G06F 16/24568 707/780 |
| 2012/0197900 | A1* | 8/2012 | Mandre ................. G06F 16/283 707/743 |
| 2013/0103657 | A1* | 4/2013 | Ikawa ............... G06F 16/90344 707/693 |
| 2016/0283483 | A1* | 9/2016 | Jiang ................. G06F 16/24578 |
| 2018/0253255 | A1* | 9/2018 | Jain ..................... G06F 11/1453 |

* cited by examiner

*Primary Examiner* — Jeff A Burke
(74) *Attorney, Agent, or Firm* — Harrity & Harrity, LLP

(57) ABSTRACT

A device stores time series data, based on time stamps, in a compact prefix tree, and receives new time series data to be added to the compact prefix tree. The device determines whether the new time series data is different than previously stored time series data in the compact prefix tree. The device selectively stores the new time series data in the compact prefix tree by storing the new time series data in the compact prefix tree when the new time series data is different than the previously stored time series data in the compact prefix tree, and updates a last time stamp for one of the previously stored time series data, based on the new time series data, when the new time series data is not different than the one of the previously stored time series data.

20 Claims, 12 Drawing Sheets

US 10,769,132 B1

EFFICIENT STORAGE AND RETRIEVAL OF TIME SERIES DATA

BACKGROUND

Time series data is a sequence of data points typically consisting of successive measurements made from a same source over a time interval for a given metric. For example, time series data may include network traffic loads at different times, network resource usage at different times, a number of cars traveling on a bridge at different times, a daily closing value of a financial market index, and/or the like. Time series data provides meaningful statistics and insights associated with networks, cloud infrastructure, applications, processes, sensors, and/or the like. Time series data may reveal actionable trends, patterns, variability, rates of change, variations, exceptions, anomalies and outliers, and/or the like.

SUMMARY

According to some implementations, a device may include one or more processors to: store time series data, based on time stamps, in a compact prefix tree data structure; receive new time series data to be added to the compact prefix tree data structure; determine whether the new time series data is different than previously stored time series data in the compact prefix tree data structure; and selectively store the new time series data in the compact prefix tree data structure based on whether the new time series data is different than the previously stored time series data in the compact prefix tree data structure. The new time series data may be stored in the compact prefix tree data structure when the new time series data is different than the previously stored time series data in the compact prefix tree data structure. A last time stamp for one of the previously stored time series data may be updated, based on the new time series data, when the new time series data matches the one of the previously stored time series data.

According to some implementations, a non-transitory computer-readable medium may store instructions that include one or more instructions that, when executed by one or more processors, cause the one or more processors to: store time series data, based on time stamps, in a compact prefix tree data structure; receive, from a plurality of network devices, new time series data to be added to the compact prefix tree data structure; determine whether the new time series data is different than previously stored time series data in the compact prefix tree data structure; and selectively store the new time series data in the compact prefix tree data structure based on whether the new time series data is different than the previously stored time series data in the compact prefix tree data structure. The new time series data may be stored in the compact prefix tree data structure when the new time series data is different than the previously stored time series data in the compact prefix tree data structure. A last time stamp for one of the previously stored time series data may be updated, based on the new time series data, when the new time series data matches the one of the previously stored time series data.

According to some implementations, a method may include: receiving, by a device, time series data from a plurality of network devices; storing, by the device and based on time stamps, the time series data in a compact prefix tree data structure; receiving, by the device, new time series data to be added to the compact prefix tree data structure; determining, by the device, whether the new time series data is different than previously stored time series data in the compact prefix tree data structure; and selectively storing, by the device, the new time series data in the compact prefix tree data structure based on whether the new time series data is different than the previously stored time series data in the compact prefix tree data structure. The device may store the new time series data in the compact prefix tree data structure when the new time series data is different than the previously stored time series data in the compact prefix tree data structure. The device may update a last time stamp for one of the previously stored time series data, based on the new time series data, when the new time series data matches the one of the previously stored time series data.

DETAILED DESCRIPTION

The following detailed description of example implementations refers to the accompanying drawings. The same reference numbers in different drawings may identify the same or similar elements.

Time series data may include different patterns. For example, time series data may include a pattern where metric data frequently changes over time (e.g., a network traffic rate, unicast or multicast traffic, network utilization, a quantity of client sessions, and/or the like). In another example, time series data may include a pattern where metric data sporadically changes over time (e.g., a network interface status, a network service status, a network interface speed, a temperature of a network device, and/or the like). Time series data may be stored in data structures (e.g., databases), and may be retrieved for future analysis using query languages. However, the data structures are not tailored to characteristics of the time series data, and are typically general purpose data structures that store any type of data. Furthermore, the time series data may consume large amounts of memory resources, and processing resources may be taxed when time series data is searched for and retrieved.

Some implementations, described herein, may provide efficient modeling, storage, and retrieval of time series data, and particularly sporadically changing time series data. In some implementations, the time series data may be stored in a data structure tailored to time series data, such as a compact prefix tree (e.g., also known as a radix tree or a Patricia tree, and is a data structure that represents a space-oriented tree in which each node that is an only child is merged with its parent node). In some implementations, the time series data may be stored using time as a key. In some implementations, new time series data need be stored in the compact prefix tree only when the new time series data is changed as compared to previously stored time series data. In some implementations, particular time series data for a particular time may be quickly obtained by traversing the compact prefix tree and retrieving the particular time series data based on the particular time.

Figure 1A:
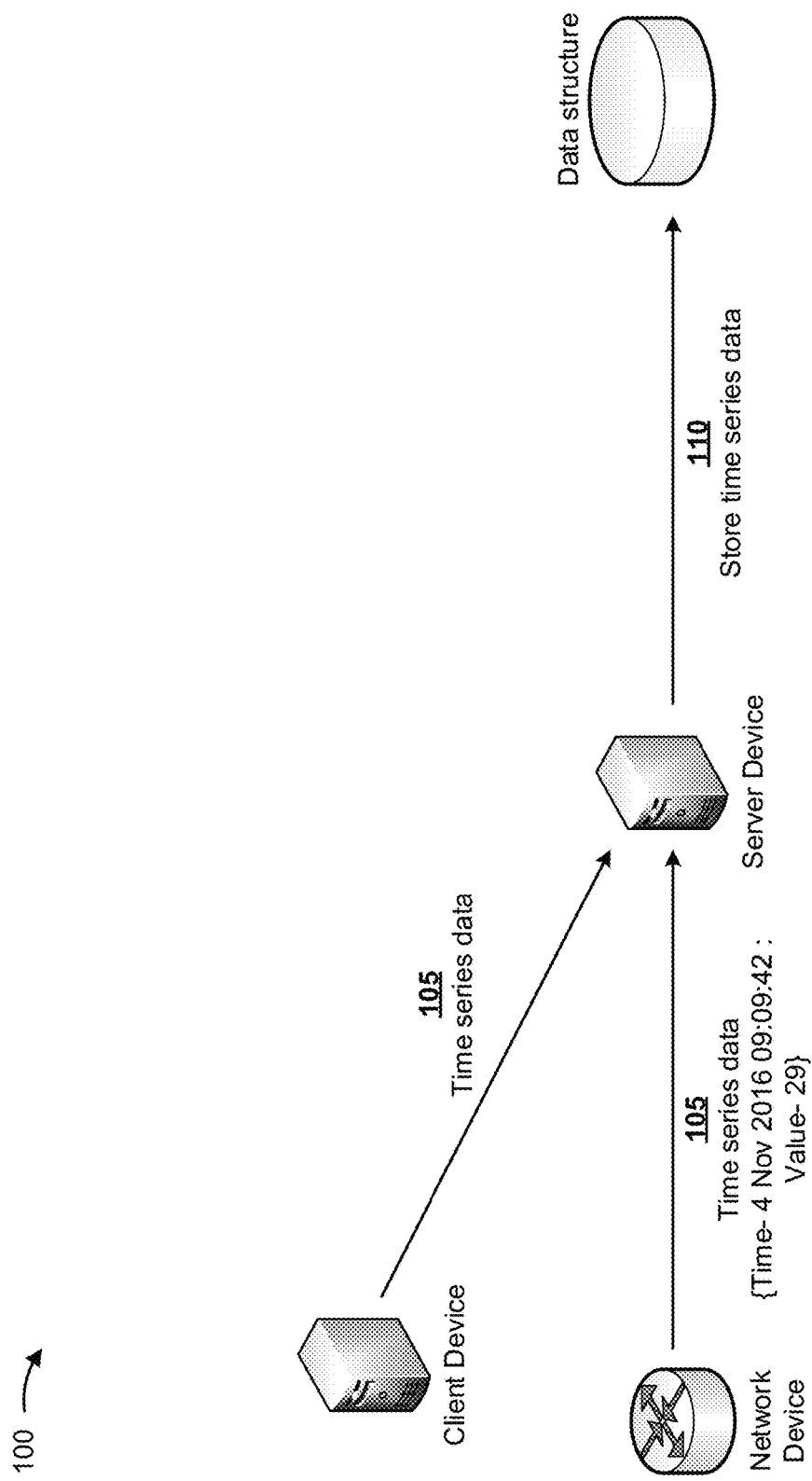
FIGS. 1A-1I are diagrams of an overview of an example implementation described herein.

FIGS. 1A-1I are diagrams of an overview of an example implementation 100 described herein. As shown in FIG. 1A, and by reference number 105, assume that a server device receives time series data from a network device associated with a network. In some implementations, the time series data may include a sequence of data points providing measurements (e.g., provided by the network device) over a time interval for a given metric. For example implementation 100, assume that the time series data includes temperatures (e.g., in Celsius, 29° C.) of the network device over a time interval (e.g., 4 Nov. 2016 09:09:42) (although one or more parameters other than temperature may be used in other example implementations). In some implementations, the server device may continuously receive the time series data from the network device, may periodically receive the time series data from the network device (e.g., when the network device generates the time series data), may receive the time series data in a batch format, and/or the like.

As further shown in FIG. 1A, and by reference number 105, the server device may receive time series data from other devices, such as from a client device. In some implementations, the client device may receive the time series data from the network device, and may provide the time series data to the server device. In some implementations, the client device may provide time series data (e.g., processor utilization by the client device over a time interval) to the server device that is different than the time series data (e.g., the temperatures of the network device over a time interval) provided by the network device. In some implementations, the server device may receive time series data from multiple network devices (e.g., tens, hundreds, thousands, or more network devices) and/or from multiple client devices (e.g., tens, hundreds, thousands, or more client devices).

As shown by reference number 110, the server device may store the time series data in a data structure associated with the server device. In some implementations, the data structure may be provided in the server device (e.g., in a memory of the server device), in a device separate from the server device, and/or the like. In some implementations, the data structure may include a tree data structure, such as a compact prefix tree (e.g., a data structure that represents a space-oriented tree in which each node that is an only child is merged with its parent node).

Figure 1B:
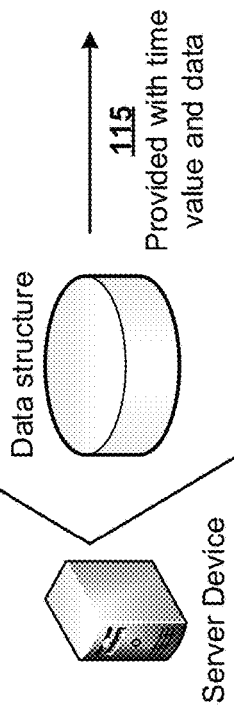

As shown in FIG. 1B, and by reference number 115, the time series data may be provided to the server device with a date and time parameter, a time long value parameter, a temperature parameter, and/or the like. The date and time parameter may provide a date and time (e.g., 4 Nov. 2016 09:09:42) associated with when the data is captured. The time long value parameter may provide a conversion of the date and time into a number of milliseconds that have elapsed since a coordinated universal time (i.e., 00:00:00 or 1 Jan. 1970). For example, the time long value of "1478250582954" may correspond to a date and time of "4 Nov. 2016 09:09:42." In some implementations, the time long value may be converted to a bit value of the time long value (e.g., a bit value of "10101100000001001111110000000001111010100" may correspond to a time long value of "1478250603956"). The temperature parameter may provide a temperature of the network device at a date and time indicated by the date and time parameter and the time long value parameter. In some implementations, the time series data may be provided to the server device with the time long value parameter and the temperature parameter. In some implementations, the time series data may be provided to the server device with the date and time parameter and the temperature parameter, and the server device may convert the date and time parameter into the time long value parameter.

Figure 1C:
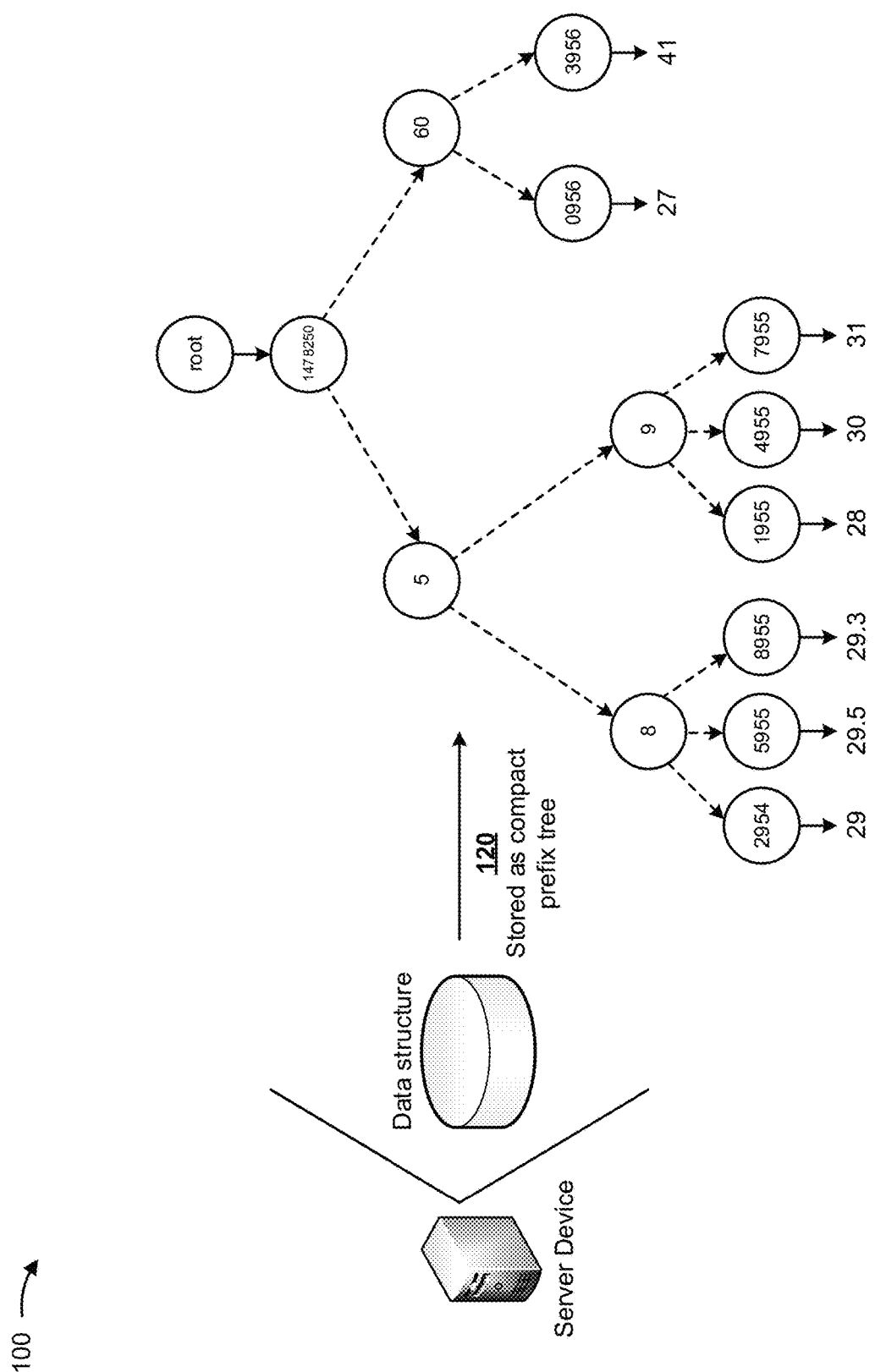

As shown in FIG. 1C, and by reference number 120, the server device may store the time series data as a compact prefix tree data structure. Since the time series data is received over time, the time stamp for each data point is incremental and there is a common prefix in a given year, month, week, day, minute, second, and/or millisecond for the time stamp. Since there is a common prefix pattern for each data point in the time series data, and queries to retrieve time series data may be based on time, the compact prefix tree may be an ideal data structure for time series data. For example, the time series data entries for "4 Nov. 2016 09:09:45" and "4 Nov. 2016 09:09:48" have a common time stamp prefix of "147825058," the time series data entries for "4 Nov. 2016 09:09:51," "4 Nov. 2016 09:09:54," and "4 Nov. 2016 09:09:57" have a common time stamp prefix of "147825059," the time series data entries for "4 Nov. 2016 09:10:00" and "4 Nov. 2016 09:10:03" have a common time stamp prefix of "147825060," and all of the time series data entries have a common time stamp prefix of "1478250."

As shown in FIG. 1C, the common prefix tree may include a root node pointing to a "1478250" prefix node, and the "1478250" prefix node may point to a "5" prefix node and a "60" prefix node. The "5" prefix node may point to an "8" prefix node and a "9" prefix node, and the "60" prefix node may point to a "0956" prefix node and a "3956" prefix node. The "8" prefix node may point to a "2954" prefix node, a "5955" prefix node, and a "8955" prefix node, and the "9" prefix node may point to a "1955" prefix node, a "4955" prefix node, and a "7955" prefix node. Each of the "2954" prefix node, the "5955" prefix node, the "8955" prefix node, the "1955" prefix node, the "4955" prefix node, the "7955" prefix node, the "0956" prefix node, and the "3956" prefix node may point to corresponding temperature data (e.g., 29, 29.5, 29.3, 28, 30, 31, 27, and 41, respectively).

In some implementations, the server device may create the common prefix tree using the following data structure syntax: Class Tree {TreeNode treeRoot; TreeNode lastInsertedNode; Object sourceOfData} and Class TreeNode {String Prefix; <Any> Value; Boolean isLeaf; Time lastUpdatedTime}, where Tree may correspond to the compact prefix tree, TreeNode may correspond to a node of the compact prefix tree, treeRoot may correspond to a root node of the compact prefix tree, lastInsertedNode may correspond to a last inserted node in the compact prefix tree, Object sourceOfData may correspond to a source of data for the compact prefix tree, String Prefix may correspond to a prefix at a node of the compact prefix tree, <Any> Value may correspond to a value stored at a leaf of the compact prefix tree, Boolean isLeaf may identify if a node is a leaf, and Time lastUpdatedTime may correspond to a last seen time stamp when a value has not changed from a previously stored value.

In some implementations, the server device may create the compact prefix tree based on the time series data. For example, if the compact prefix tree is empty and in order to add new time series data to the compact prefix tree, the server device may add a new node to the compact prefix tree. The server device may set a prefix of the new node to a time stamp of the new time series data, may set the lastInsertedNode to point to the new node, and may associate a value of the new time series data with the lastInsertedNode.

In some implementations, if the compact prefix tree is not empty and in order to add the new time series data to the compact prefix tree, the server device may identify a value of the lastInsertedNode, and may compare the value of the lastInsertedNode with the value of the new time series data. If the values are the same, the server device may not add a new node to the compact prefix tree, but may update the lastUpdatedTime with the time stamp of the new time series data. This may prevent the server device from adding duplicative time series data to the compact prefix tree, which may conserve resources of the server device. If the values are different, the server device may add a new node to the compact prefix tree. The server device may set a prefix of the new node to a time stamp of the new time series data, may set the lastInsertedNode to point to the new node, and may associate a value of the new time series data with the lastInsertedNode.

In some implementations, the server device may use the syntax TreeNode insert(key, value, TreeNode) to insert new time series data in the compact prefix tree. If a prefix at the node (e.g., TreeNode) is a subset of the key (e.g., the time stamp of the new time series data), the server device may proceed to child nodes of the node, and may determine a correct position to insert the new time series data. The server device may iterate through all the child nodes of the node, and may insert the new time series data at a correct child node. If there are no prefix matches with the child nodes of the node, the server device may insert a new node and associate the new node with the node. If the prefix of the node and the time stamp of the new time series data share a common prefix, the server device may split the node with the common prefix into an older node and a new node for the new time series data. The server device may associate the older node and the new node with the common prefix node. If the prefix of the node is a common prefix for the time stamp of the new time series data, the server device may create a new node, for the time series data, under the node.

Figure 1D:
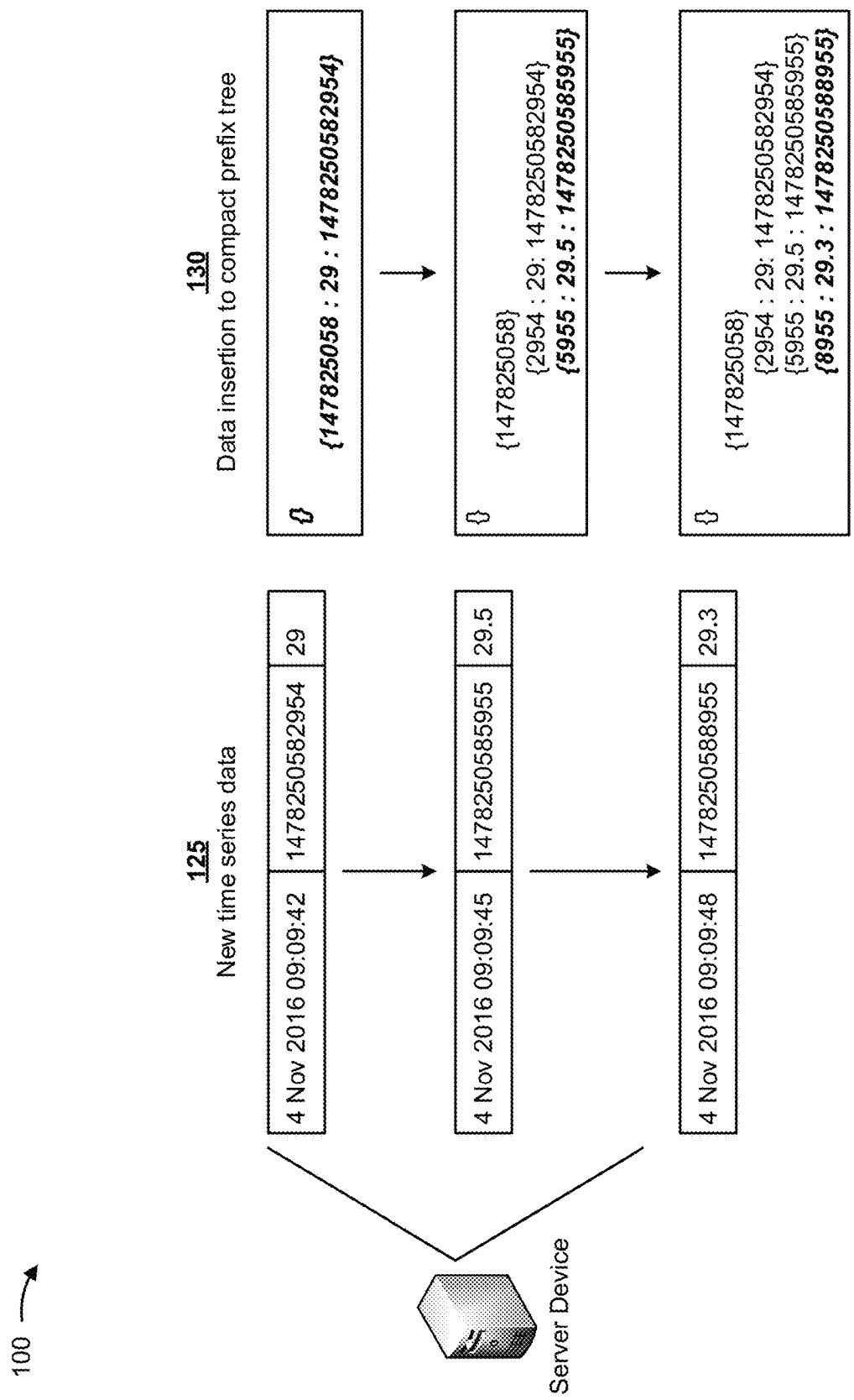
Figure 1E:
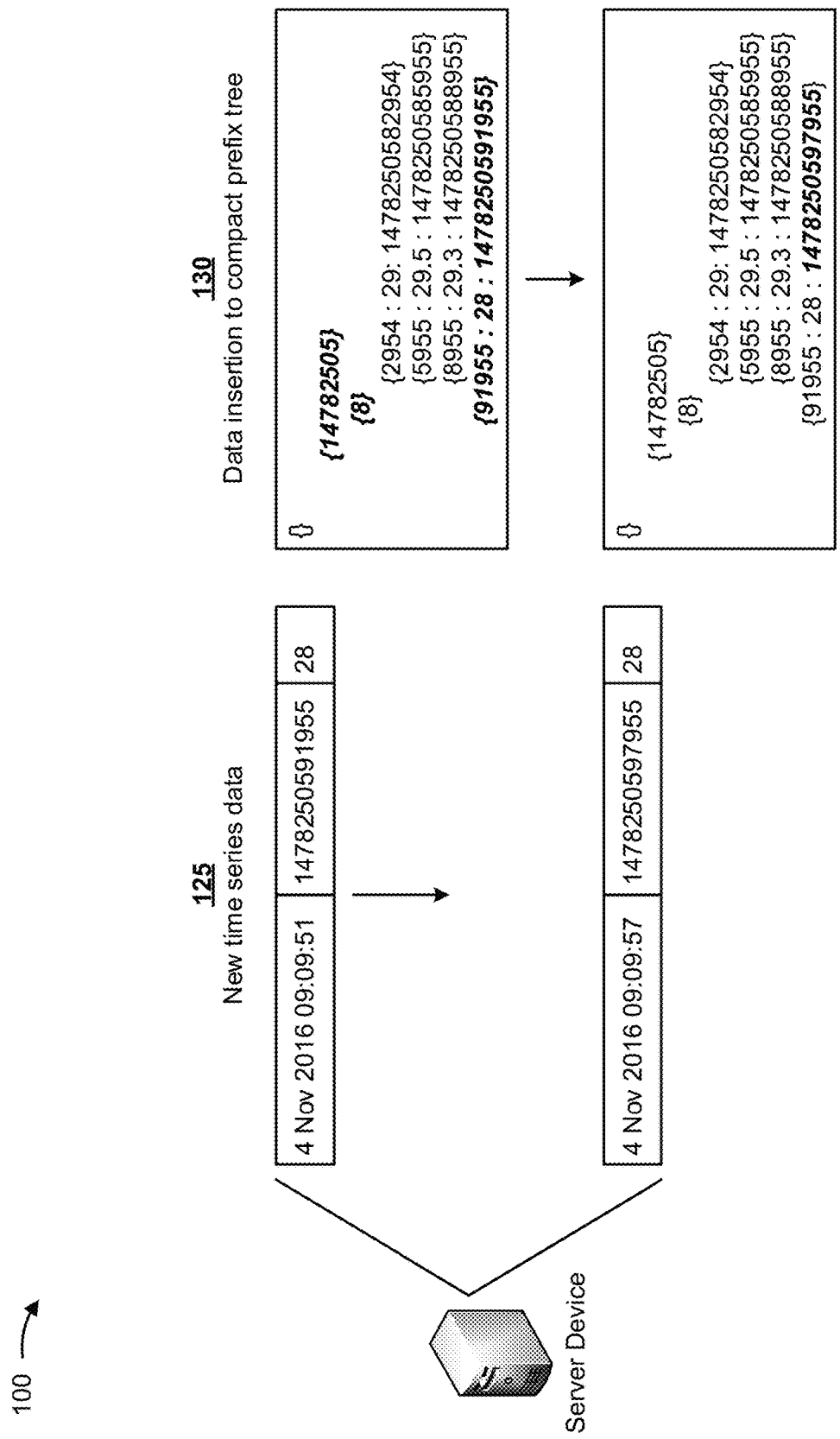
Figure 1F:
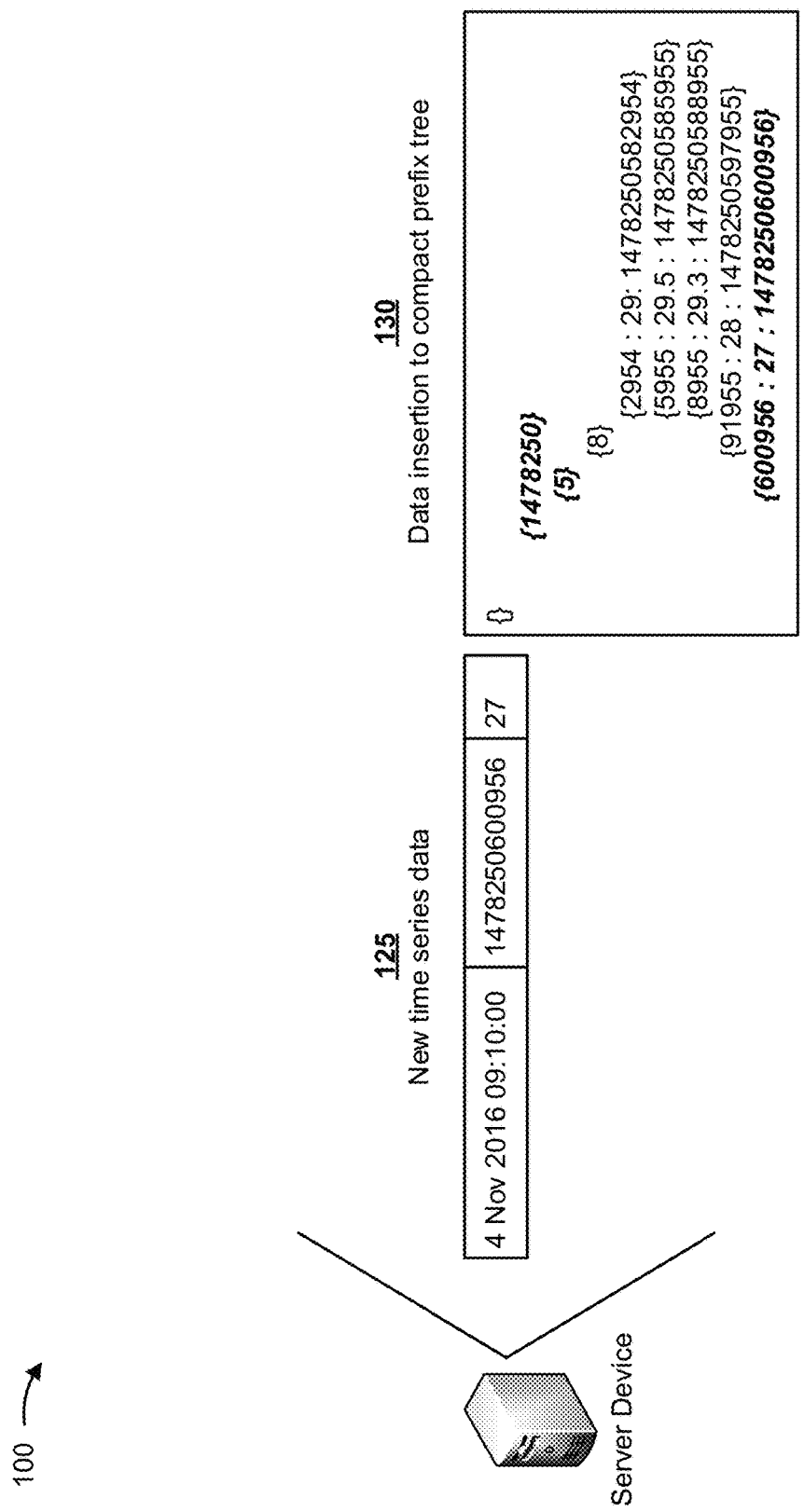

FIGS. 1D-1F provide example operations for creating some of the compact prefix tree shown in FIG. 1C. As shown in FIG. 1D, and by reference number 125, when new time series data is provided to the server device, the server device may insert the new time series data in the compact prefix tree, as indicated by reference number 130. For example, if the new time series data includes a first entry (e.g., 4 Nov. 2016 09:09:42, 1478250582954, 29), the server device may create a root node (e.g., { }) and a node (e.g., {Prefix—1478250582954: Value—29: lastInsertedTime—1478250582954}). If the new time series data includes a second entry (e.g., 4 Nov. 2016 09:09:45, 1478250585955, 29.5), the server device may create a first leaf (e.g., {2954:29:1478250582954}) and a second leaf (e.g., {5955:29.5:1478250585955}) for the node. If the new time series data includes a third entry (e.g., 4 Nov. 2016 09:09:48, 1478250588955, 29.3), the server device may create a third leaf (e.g., {8955:29.3:1478250588955}) for the node.

Continuing with this example, and as shown in FIG. 1E, if the new time series data includes a fourth entry (e.g., 4 Nov. 2016 09:09:51, 1478250591955, 28), the server device may split the node (e.g., {147825058}) into a node (e.g., {14782505}) and a node (e.g., {8}), and may associate the first leaf (e.g., {2954:29:1478250582954}), the second leaf (e.g., {5955:29.5:1478250585955}), and the third leaf (e.g., {8955:29.3:1478250588955}) with the node (e.g., {8}). The server device may also create a node (e.g., {91955:28:1478250591955}) for the fourth entry, and may associate the node (e.g., {91955:28:1478250591955}) with the node (e.g., {14782505}). If the new time series data includes a fifth entry (e.g., 4 Nov. 2016 09:09:57, 1478250597955, 28), the server device may not create another node since the value (e.g., 28) of the fifth entry is the same as the value in the node (e.g., {91955:28:1478250591955}) (e.g., the temperature remains the same). However, the server device may update the time stamp of the node (e.g., {91955:28:1478250591955}) from "1478250591955" to "1478250597955."

Continuing with this example, and as shown in FIG. 1F, if the new time series data includes a sixth entry (e.g., 4 Nov. 2016 09:10:00, 1478250600956, 27), the server device may split the node (e.g., {14782505}) into a node (e.g., {1478250}) and a node (e.g., {5}), and may associate the node (e.g., {8}) and the node (e.g., {91955:28:1478250597955}) with the node (e.g., {5}). The server device may also create a node (e.g., {(e.g., {600956:27:1478250600956}) for the sixth entry, and may associate the node (e.g., {(e.g., {600956:27:1478250600956}) with the node (e.g., {1478250}). This process may continue until the compact prefix tree shown in FIG. 1C is created by the server device.

Figure 1G:
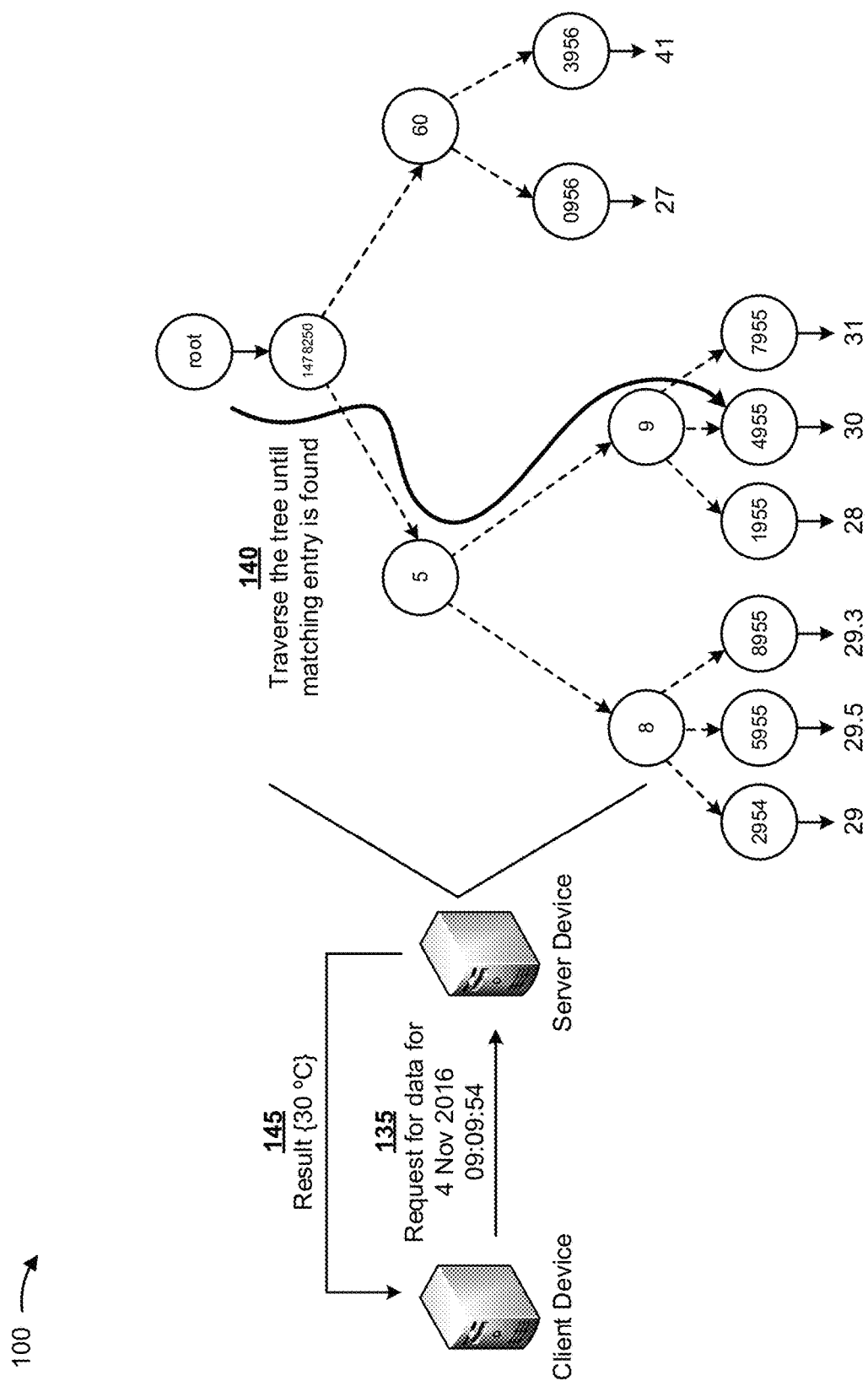

As shown in FIG. 1G, the server device may retrieve particular time series data, associated with a particular date and time, from the compact prefix tree. For example, as shown by reference number 135, the client device may provide, to the server device, a request for particular time series data associated with a particular date and time (e.g., data for 4 Nov. 2016 09:09:54), and the server device may receive the request. As shown by reference number 140, the server device may traverse the compact prefix tree until an entry in the compact prefix tree matches the particular date and time provided in the request. For example, since the particular date and time corresponds to a time long value of "1478250594955," the server device may traverse from the root node, to the "1478250" node, to the "5" node, to the "9" node, and finally to the "4955" node to find the matching entry. The server device may obtain the time series data associated with the matching entry (e.g., 30° C.) from the compact prefix tree, and may return the time series data to the client device as a result, as indicated by reference number 145.

In some implementations, the server device may retrieve the particular time series data, associated with the particular date and time, from the compact prefix in the following manner. For example, the server device may start at the root node of the compact prefix tree, and may initialize a time match length (e.g., a length of the time prefix) to zero. The particular date and time (e.g., 1478250594955) may include a time length of thirteen (13) digits. The server device may traverse the compact prefix tree, and may compare the particular date and time with a prefix of the node (e.g., the "1478250" node) connected to the root node. The server device may determine that the prefix of the "1478250" node matches the beginning of the particular date and time, and may set the time match length to seven (7) (e.g., the length of the prefix). The server device may compare the time match length with the time length (e.g., 13) of the particular date and time. If the time match length is equal to the time length of the particular date and time, the server device may return a value associated with the "1478250" node. However, since the time match length does not equal the time length of the particular date and time, the server device may traverse the compact prefix tree to the next node and may repeat the comparison. This may continue until the time match length of a node equals to the time length of the particular date and time.

Figure 1H:
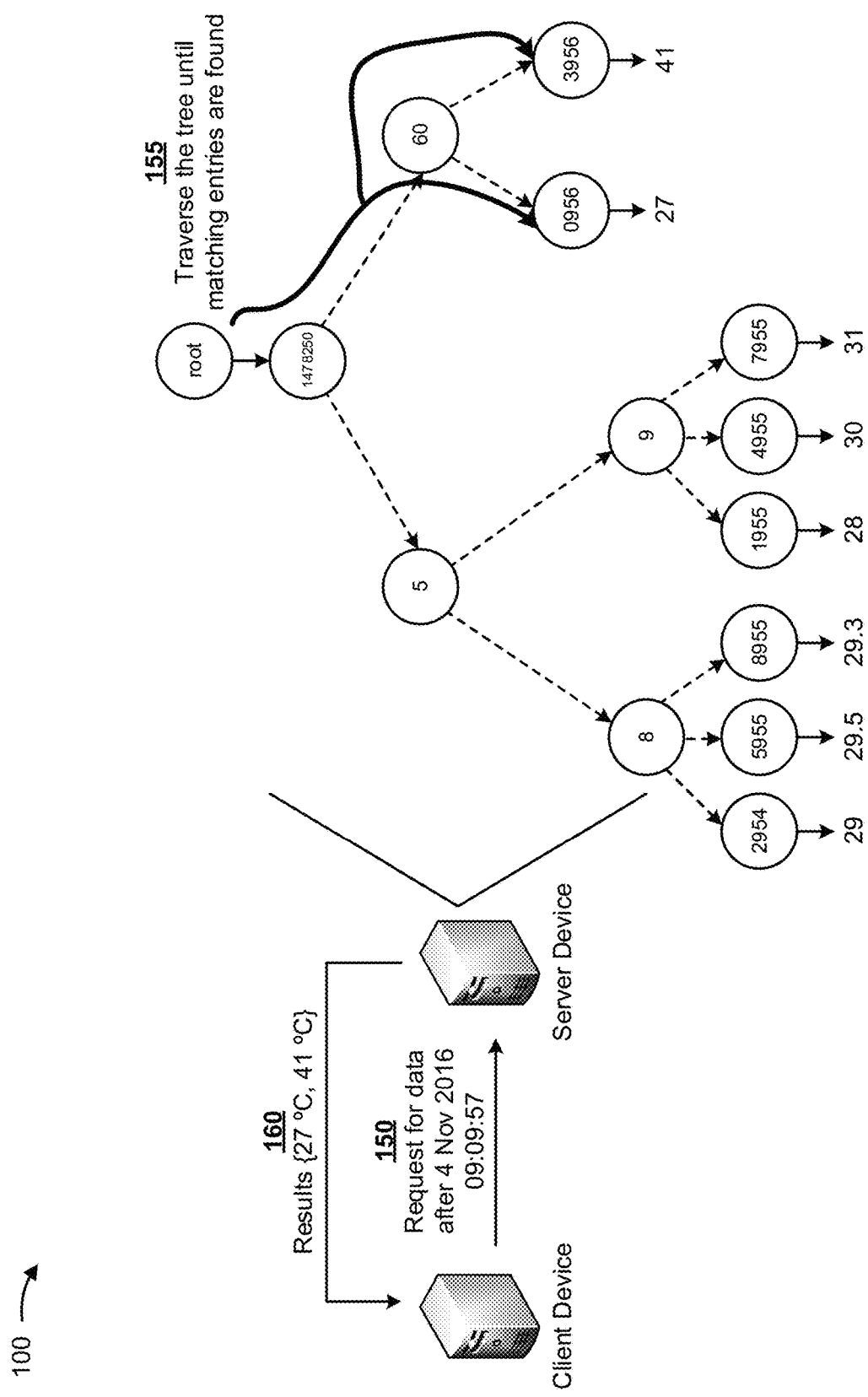

As shown in FIG. 1H, the server device may retrieve particular time series data, received after a particular date and time, from the compact prefix tree. For example, as shown by reference number 150, the client device may provide, to the server device, a request for particular time series data received after a particular date and time (e.g., data for 4 Nov. 2016 09:09:57), and the server device may receive the request. As shown by reference number 155, the server device may traverse the compact prefix tree until entries in the compact prefix tree match dates and times that occur after the particular date and time provided in the request. For example, since the particular date and time corresponds to a time long value of "1478250597955," the server device may traverse from the root node, to the "1478250" node, to the "60" node, and finally to the "0956" and "3956" nodes to find the matching entries. The server device may obtain the time series data associated with the matching entries (e.g., 27° C. and 41° C.) from the compact prefix tree, and may return the time series data to the client device as a result, as indicated by reference number 160.

In some implementations, the server device may retrieve the particular time series data, received after the particular date and time, from the compact prefix in the following manner. For example, the server device may modify the particular date and time (e.g., 1478250597955) by removing one or more of the digits associated with a month, a day, hours, minutes, and/or seconds of the particular date and time. For example, if the request is for time series data after 4 Nov. 2016, the server device may remove the digits for the hours, the minutes, and the seconds from the particular date and time to generate a search string (e.g., "1478"). In another example, if the request is for time series data after 4 Nov. 2016 09, the server device may remove the digits for the minutes and the seconds from the particular date and time to generate a search string (e.g., "14782505"). The server device may traverse the compact prefix tree based on the search string, and may determine matches between the search string and prefixes of nodes in the compact prefix tree. The server device may return values for nodes associated with prefixes that match the search string.

Figure 1I:
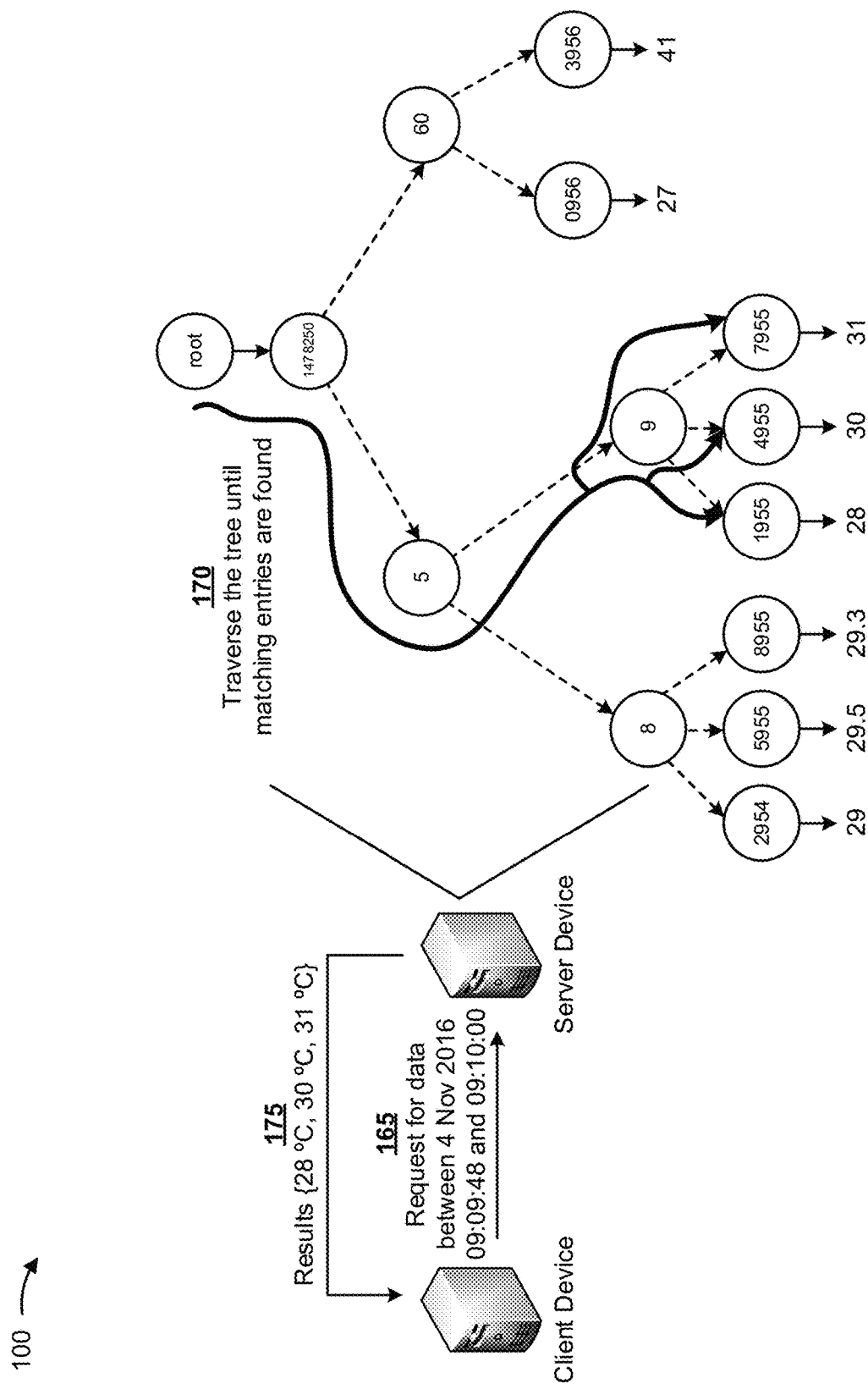

As shown in FIG. 1I, the server device may retrieve particular time series data, received after a first date and time and before a second date and time, from the compact prefix tree. For example, as shown by reference number 165, the client device may provide, to the server device, a request for particular time series data received after a first date and time (e.g., 4 Nov. 2016 09:09:48) and before a second date and time (e.g., 4 Nov. 2016 09:10:00), and the server device may receive the request. As shown by reference number 170, the server device may traverse the compact prefix tree until entries in the compact prefix tree match dates and times that occur after the first date and time and before the second date and time. For example, since the first date and time corresponds to a time long value of "1478250588955" and the second date and time corresponds to a time long value of "1478250600956," the server device may traverse from the root node, to the "1478250" node, to the "5" node, to the "9" node, and finally to the "1955," "4955," and "7955" nodes to find the matching entries. The server device may obtain the time series data associated with the matching entries (e.g., 28° C., 30° C., and 31° C.) from the compact prefix tree, and may return the time series data to the client device as a result, as indicated by reference number 175.

In some implementations, the server device may retrieve the particular time series data, received after the first date and time and before the second date and time, from the compact prefix in the following manner. For example, the server device may modify the first date and time (e.g., 1478250588955) by removing one or more of the digits associated with a month, a day, hours, minutes, and/or seconds of the first date and time, as described above, to generate a first search string. The server device may traverse the compact prefix tree based on the first search string, and may determine prefixes of nodes in the compact prefix tree that are greater than the first search string. For the nodes associated with prefixes that are greater than the first search string, the server device may determine whether the prefixes are less than the second date and time (e.g., 1478250600956). The server device may return values for nodes associated with prefixes that are greater the first search string and less than the second date and time.

In some implementations, the server device may identify a quantity of times that time series data has changed over time. For example, the server device may traverse the compact prefix tree, and may identify nodes associated with values. The quantity of nodes associated with the values may provide an indication of the quantity of times that the times series data in the compact prefix tree has changed over time. The server device may count the number of identified nodes, and may return the count as the quantity of times that the time series data has changed over time.

In this way, some implementations, described herein, may enable a server device to conserve resources (e.g., processor resources, memory resources, and/or the like) since the server device may reduce memory requirements by storing the time series data in the compact prefix tree. The server device may not add new time series data to the compact prefix tree if the new time series data is the same as previously stored time series data, which may conserve memory usage and processor usage associated with adding new data to the compact prefix tree. The server device may quickly retrieve requested time series data from the compact prefix tree (e.g., compared to general purpose data structures), which may conserve processor usage by the server device.

As indicated above, FIGS. 1A-1I are provided merely as an example. Other examples are possible and may differ from what was described with regard to FIGS. 1A-1I.

Figure 2:
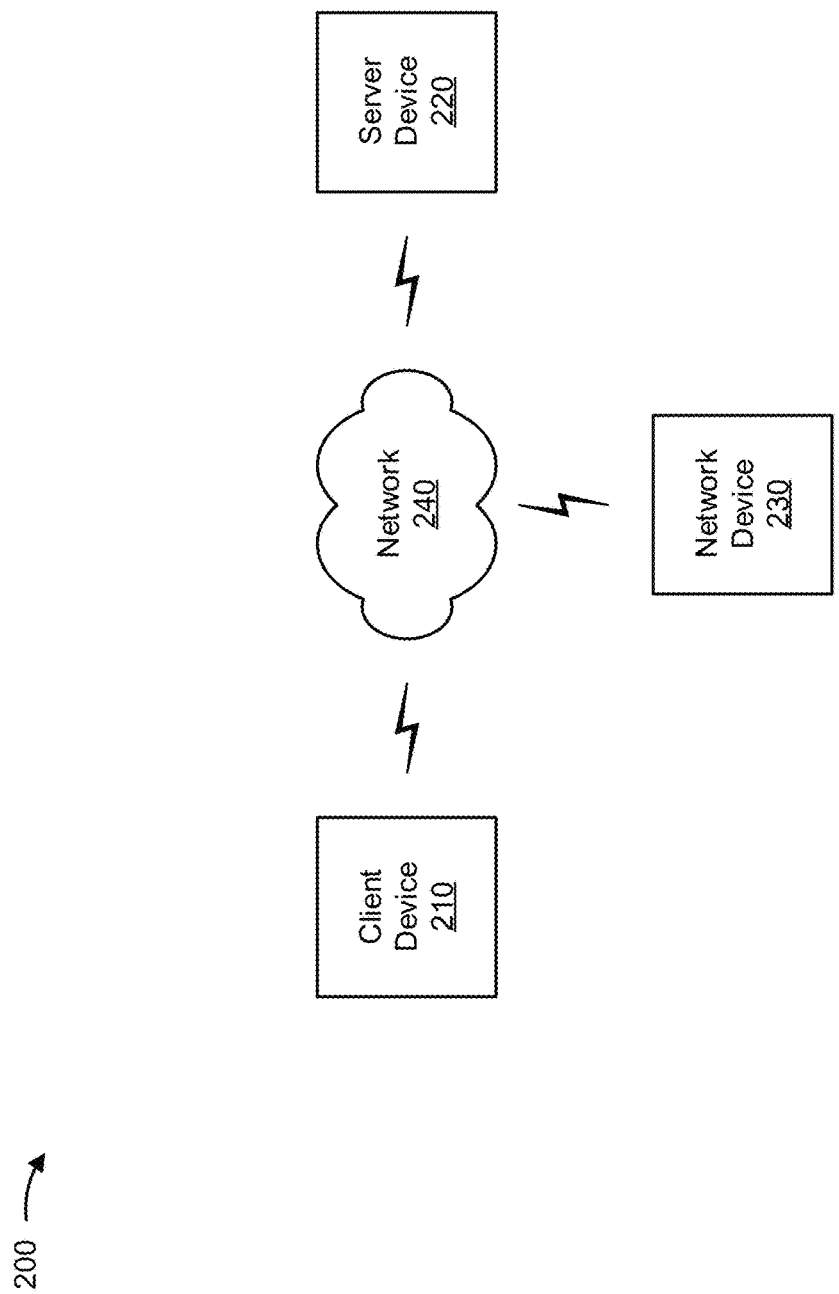
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include a client device 210, a server device 220, a network device 230, and a network 240. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a global positioning system (GPS) device, or a similar type of device. In some implementations, client device 210 may receive information from and/or transmit information to another device in environment 200, such as server device 220 and/or network device 230.

Server device 220 includes one or more devices capable of receiving, generating, storing, processing, and/or providing information, such as information described herein. For example, server device 220 may include a computing device, such as a server device or a group of server devices. In some implementations, server device 220 may receive information from and/or transmit information to another device in environment 200, such as client device 210 and/or network device 230. In some implementations, one or more of the functions performed by server device 220 may be hosted in a cloud computing environment or may be partially hosted in a cloud computing environment.

Network device 230 includes one or more devices (e.g., one or more traffic transfer devices) capable of processing and/or transferring traffic between endpoint devices. For example, network device 230 may include a firewall, a router, a gateway, a switch, a hub, a bridge, a reverse proxy, a server (e.g., a proxy server), a security device, an intrusion detection device, a load balancer, or a similar device. In some implementations, network device 230 may be provided in network 240, and may be one of many network devices 230 provided in network 240. In some implementations, network device 230 may receive information from and/or transmit information to another device in environment 200, such as client device 210 and/or server device 220. In some implementations, network device 230 may be a physical device implemented within a housing, such as a chassis. In some implementations, network device 230 may be a virtual device implemented by one or more computer devices of a cloud computing environment or a data center.

Network 240 includes one or more wired and/or wireless networks. For example, network 240 may include may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200. In some implementations, there can be many client devices 210 and/or network devices 230 (e.g., tens, hundreds, thousands, or more client devices 210 and/or network devices 230).

Figure 3:
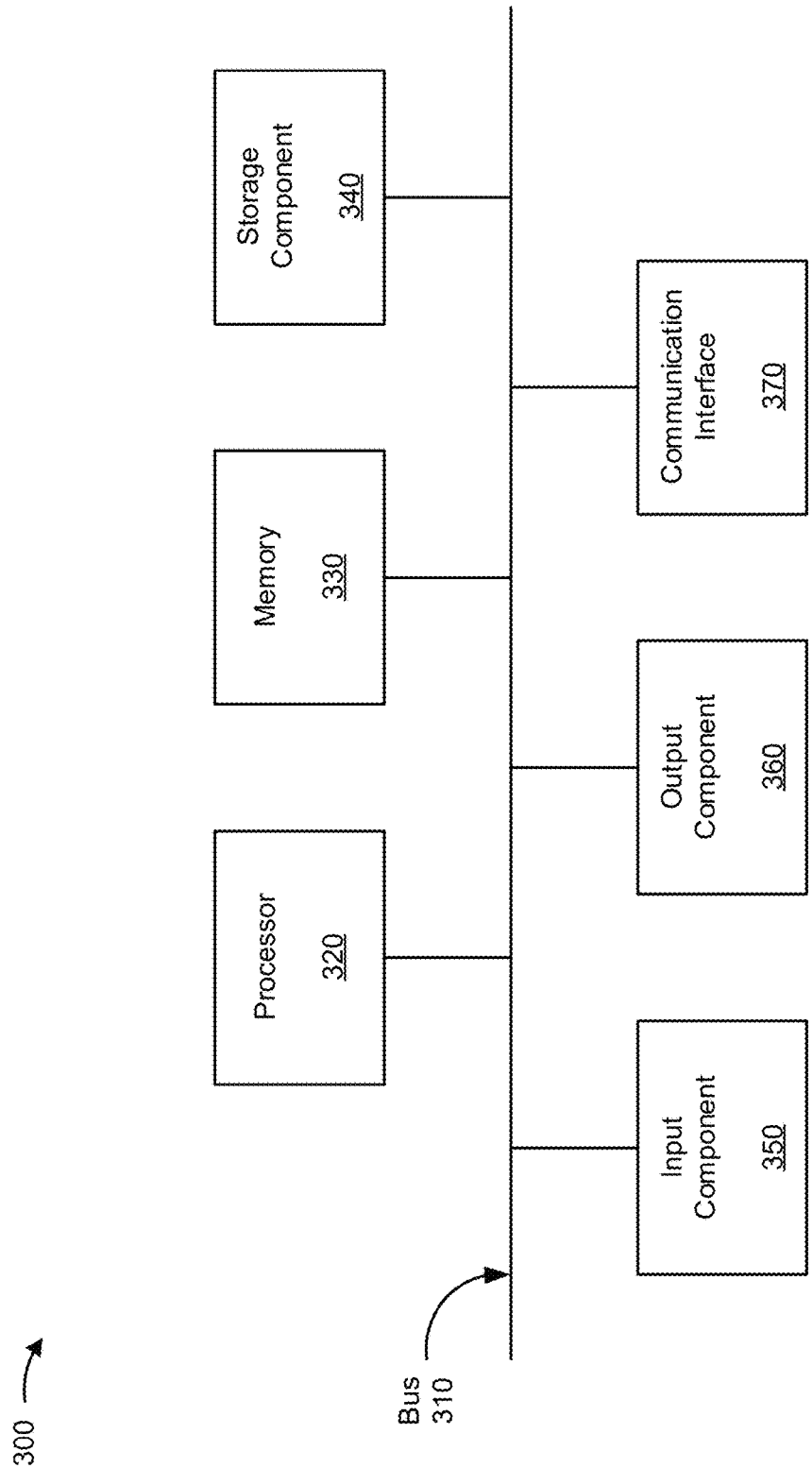
FIG. 3 is a diagram of example components of one or more devices of FIG. 2.

FIG. 3 is a diagram of example components of a device 300. Device 300 may correspond to client device 210, server device 220, and/or network device 230. In some implementations, client device 210, server device 220, and/or network device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
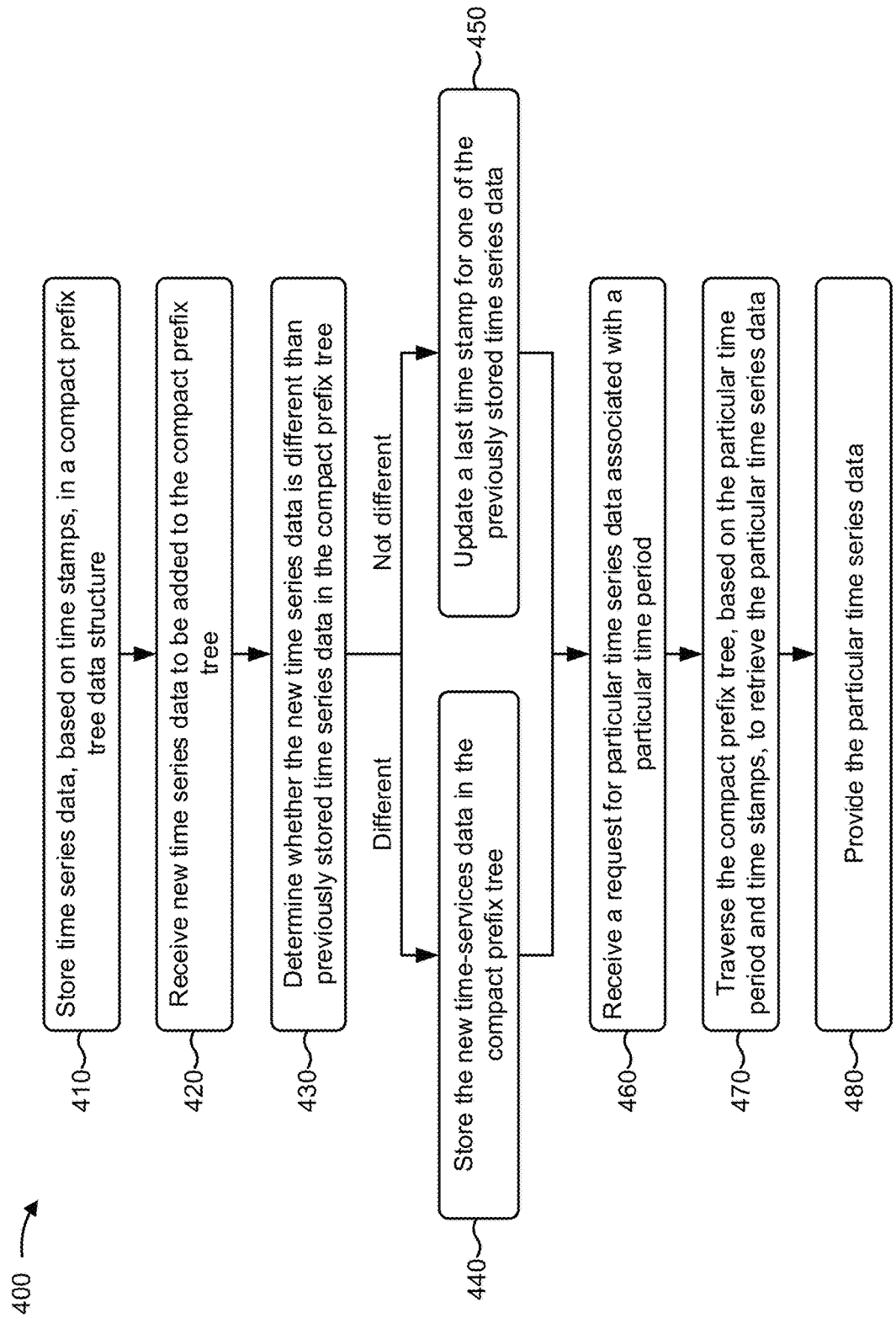
FIG. 4 is a flow chart of an example process for storing time series data in a data structure and retrieving time series data from the data structure.

FIG. 4 is a flow chart of an example process 400 for storing time series data in a data structure and retrieving time series data from the data structure. In some implementations, one or more process blocks of FIG. 4 may be performed by server device 220. In some implementations, one or more process blocks of FIG. 4 may be performed by another device or a group of devices separate from or including server device 220, such as client device 210 and/or network device 230.

As shown in FIG. 4, process 400 may include storing time series data, based on time stamps, in a complex prefix tree data structure (block 410). For example, server device 220 may store time series data, based on time stamps, in a complex prefix tree data structure. In some implementations, server device 220 may receive time series data from network device 230. In some implementations, the time series data may include a sequence of data points providing measurements (e.g., provided by the network device) over a time interval for a given metric. In some implementations, server device 220 may continuously receive the time series data from network device 230, may periodically receive the time series data from network device 230 (e.g., when network device 230 generates the time series data), may receive the time series data in a batch format, and/or the like.

In some implementations, server device 220 may store the time series data in a data structure associated with server device 220. In some implementations, the data structure may be provided in server device 220 (e.g., in a memory of server device 220), in a device separate from server device 220, and/or the like. In some implementations, the data structure may include a tree data structure, such as a compact prefix tree (e.g., a data structure that represents a space-oriented tree in which each node that is an only child is merged with its parent node).

In this way, server device 220 may store time series data in a manner that facilitates conservation of memory resources, such as in a compact prefix tree data structure.

As further shown in FIG. 4, process 400 may include receiving new time series data to be added to the compact prefix tree (block 420). For example, server device 220 may receive new time series data to be added to the compact prefix tree. In some implementations, after storing the time series data in the compact prefix tree, server device 220 may receive new time series data to be added to the existing compact prefix tree. For example, server device 220 may receive new time series data from network device 230, after server device 220 has received prior time series data from network device 230 and stored the prior time series data in the compact prefix tree.

As further shown in FIG. 4, process 400 may include determining whether the new time series data is different than previously stored time series data in the compact prefix tree (block 430). For example, server device 220 may determine whether the new time series data is different than previously stored time series data in the compact prefix tree. In some implementations, if the compact prefix tree is not empty and in order to add the new time series data to the compact prefix tree, server device 220 may identify a value of the lastInsertedNode, and may compare the value of the lastInsertedNode with the value of the new time series data.

As further shown in FIG. 4, if the new time series data is different than the previously stored time series data (block 430—Different), process 400 may include storing the new time-services data in the compact prefix tree (block 440). For example, if server device 220 determines that the new time series data is different than the previously stored time series data, server device 220 may store the new time-services data in the compact prefix tree. In some implementations, if the value of the lastInsertedNode is different than the value of the new time series data, server device 220 may add a new node to the compact prefix tree. Server device 220 may set a prefix of the new node to a time stamp of the new time series data, may set the lastInsertedNode to point to the new node, and may associate a value of the new time series data with the lastInsertedNode.

As further shown in FIG. 4, if the new time series data is not different than the previously stored time series data (block 430—Not different), process 400 may include updating a last time stamp for one of the previously stored time series data (block 450). For example, if server device 220 determines that the new time series data is not different than the previously stored time series data, server device 220 may update a last time stamp for the previously stored time series data. In some implementations, if the value of the lastInsertedNode is the same as the value of the new time series data, server device 220 may not add a new node to the compact prefix tree, but may update the lastUpdatedTime with the time stamp of the new time series data. This may prevent server device 220 from adding duplicative time series data to the compact prefix tree, which may conserve resources of the server device.

As further shown in FIG. 4, process 400 may include receiving a request for particular time series data associated with a particular time period (block 460). For example, server device 220 may receive a request for particular time series data associated with a particular time period. In some implementations, client device 210 may provide, to server device 220, a request for particular time series data associated with a particular date and time (e.g., data for 4 Nov. 2016 09:09:54), and server device 220 may receive the request.

As further shown in FIG. 4, process 400 may include traversing the compact prefix tree, based on the particular time period and the time stamps, to retrieve the particular time series data (block 470). For example, server device 220 may traverse the compact prefix tree, based on the particular time period and the time stamps, to retrieve the particular time series data. In some implementations, server device 220 may traverse the compact prefix tree until an entry in the compact prefix tree matches the particular date and time provided in the request. For example, if the particular date and time corresponds to a time long value of "1478250594955," server device 220 may traverse from a root node, to a "1478250" node, to a "5" node, to a "9" node, and finally to a "4955" node to find the matching entry. Server device 220 may obtain the time series data associated with the matching entry from the compact prefix tree, and may retrieve the time series data. If server device 220 is unable to find a matching entry in the compact prefix tree, server device 220 may return a result indicating that there is no time series data that matches the particular data and time provided in the request.

As further shown in FIG. 4, process 400 may include providing the particular time series data (block 480). For example, server device 220 may provide the particular time series data. In some implementations, server device 220 may provide the particular time series data to client device 210, and client device 210 may display the particular time series data. In some implementations, server device 220 may provide the particular time series data to a memory associated server device 220.

In some implementations, server device 220 may utilize the time series data and the compact prefix tree to generate one or more statistics, reports associated with the one or more statistics, alerts associated with the one or more statistics, graphs associated with the one or more statistics, and/or the like. For example, server device 220 may generate an alert upon identifying a change in particular time series data, and may provide the alert to interested parties (e.g., via client device 210).

In some implementations, server device 220 may utilize the time series data in the compact prefix tree to automatically cause a change in a characteristic of network device 230 depending on the particular time series data. This may enable server device 220 to update or troubleshoot network device 230. In some implementations, server device 220 may utilize the time series data in the compact prefix tree to automatically cause network device 230 to go offline, online, or reboot. This may enable server device 220 to update, configure, or troubleshoot network device 230.

In some implementations, server device 220 may utilize the time series data in the compact prefix tree to automatically cause a link to be taken offline or to come online. This may enable server device 220 to control links in a network. In some implementations, server device 220 may utilize the time series data in the compact prefix tree to automatically cause another network device 230 to take over for a particular network device 230. This may enable server device 220 to improve network performance by replacing faulty network devices 230 with other network devices 230.

In some implementations, server device 220 may utilize the time series data in the compact prefix tree to automatically cause network device 230 to increase the rate at which new time series data is sent to server device 220, automatically cause another network device 230 to start providing new time series data, automatically cause another network device 230 to come online or go offline, and/or the like. This may enable server device 220 to control operations of the network associated with network devices 230.

In some implementations, server device 220 may utilize and/or analyze the compact prefix tree to determine one or more statistics associated with the time series data. In some implementations, the one or more statistics may include actionable trends, patterns, variability, rates of change, variations, exceptions, anomalies and outliers, and/or the like, associated with the time series data. The one or more statistics may provide significant insights with respect to a variety of items, such as networks, cloud infrastructure, applications, processes, sensors, Internet of things (IoT) devices, and/or the like. Such insights may prevent errors in such items and/or may provide operations, associated with such items, that are safer, more productive, more durable, more reliable, more efficient, and/or the like.

In various implementations, server device 220 may utilize the time series data in a variety of ways. For example, server device 220 may utilize the time series data to plot graphs for a particular metric of the time series data. As another example, server device 220 may provide a notification of a change in the time series data to users interested in such a change (e.g., a network administrator may be interested in being alerted about a network receiving a quantity of traffic greater than a threshold quantity). In such an example, server device 220 may determine a difference between a current quantity of traffic and a previous quantity of traffic, and may generate an alert when the difference satisfies the threshold quantity. As another example, server device 220 may compare the time series data to a predetermined threshold, and may cause an action to be performed if the time series data satisfies the predetermined threshold (e.g., if server device 220 determines that data from a toxic gas sensor is greater than a threshold, server device 220 may cause an alarm to be generated). As another example, server device 220 may retrieve a time series data value at a given time or during a given time period (e.g., starting at a particular time, lasting for a particular duration of time, etc.). As another example, server device 220 may determine a number of times that the time series data changes during a particular duration of time.

In some implementations, the compact prefix tree may optimize memory utilization by server device 220 when storing time series data, and particularly sporadically changing time series data. For example, server device 220 may use the compact prefix tree to store time series data based on common prefixes that are only stored once but relate to numerous time series data values. In this way, the compact prefix tree may require much less memory to store the time series data as compared to other data structures, such as hash tables or lists. For example, assume that time series data is collected every second for one hour, and that a thirteen-digit time long value is used for each data point. In such an example, a hash table or list would require 93,600 bytes (e.g., 2×13 per entry×3600 seconds in an hour) to store the time series data, whereas the compact prefix tree would only require approximately 29,000 bytes to store the same time series data (e.g., approximately a 70% savings of storage space).

In some implementations, server device 220 may conserve resources when adding, to the compact prefix tree, time series data that does not change compared to previously stored time series data. For example, since unchanged time series data does not require a new node to be inserted in the compact prefix tree, server device 220 saves resources associated with inserting a new node in the compact prefix tree. As a particular example, using a thirteen-digit time long value for each time series data point, the compact prefix tree may require an amount of insertions that is less than or equal to $O(mN)$ where m is the length of a data point (e.g., 13) and N is a number of possible values (e.g., 0 to 9).

In some implementations, server device 220 may conserve resources when searching for and retrieving time series data from the compact prefix tree. For example, using a thirteen-digit time long value for each time series data point, server device 220 needs to search an amount of data points that is less than or equal to $O(m)$ where m is the length of a data point (e.g., 13). In contrast, a hash table data structure, the amount of data points that needs to be searched is $O(n)$, where n is a number of records in the hash table and is greater than m.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations, described herein, may provide efficient modeling, storage, and retrieval of time series data, and particularly sporadically changing time series data. In some implementations, the time series data may be stored in a data structure tailored to time series data, such as a compact prefix tree. In some implementations, the time series data may be stored using time as a key. In some implementations, new time series data need be stored in the compact prefix tree only when the new time series data is changed as compared to previously stored time series data. In some implementations, particular time series data for a particular time may be quickly obtained by traversing the compact prefix tree and retrieving the particular time series data based on the particular time.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A device, comprising:
   one or more processors to:
   receive time series data that includes a time stamp date and time parameter;
   convert the time stamp date and time parameter into a first time long value parameter;
   store the time series data, based on the first time long value parameter, in a compact prefix tree data structure that is based on a time long format;
   receive new time series data to potentially be stored in the compact prefix tree data structure;
   convert a time stamp date and time parameter of the new time series data into a second time long value parameter;
   determine whether a physical parameter of the new time series data is different than a corresponding physical parameter of the previously stored time series data in the compact prefix tree data structure; and
   selectively store the new time series data in the compact prefix tree data structure based on whether the physical parameter of the new time series data is different than the corresponding physical parameter of the previously stored time series data in the compact prefix tree data structure,
   the new time series data to be stored in the compact prefix tree data structure when the physical parameter of the new time series data is different than the corresponding physical parameter of the previously stored time series data in the compact prefix tree data structure, or
   a last time stamp for the previously stored time series data to be updated, based on the new time series data and without storing the new time series data, when the physical parameter of the new time series data matches the corresponding physical parameter of the previously stored time series data.

2. The device of claim 1, where the one or more processors are further to:
   receive, from another device, a request for particular time series data associated with a particular time period;
   traverse the compact prefix tree data structure, based on the particular time period and the time long format, to retrieve the particular time series data; and
   provide the particular time series data to the other device.

3. The device of claim 1, where the one or more processors are further to:
   generate one or more statistics based on the previously stored time series data in the compact prefix tree data structure.

4. The device of claim 1, where the one or more processors are further to:
   generate one or more statistics based on the new time series data and the previously stored time series data in the compact prefix tree data structure.

5. The device of claim 1, where the one or more processors are further to:
   determine, when the physical parameter of the new time series data is different than the physical parameter of the previously stored time series data in the compact prefix tree data structure, whether a difference between the physical parameter of the new time series data and the physical parameter of the previously stored time series data satisfies a threshold; and
   generate an alert when the difference between the physical parameter of the new time series data and the physical parameter of the previously stored time series data satisfies the threshold.

6. The device of claim 1, where the physical parameter is a temperature parameter.

7. The device of claim 1, where the one or more processors are further to:
   receive the time series data from one or more network devices associated with a network.

8. A non-transitory computer-readable medium storing instructions, the instructions comprising:
   one or more instructions that, when executed by one or more processors, cause the one or more processors to:

receive time series data that includes a time stamp date and time parameter;
convert the time stamp date and time parameter into a first time long value parameter;
store the time series data, based on the first time long value parameter, in a compact prefix tree data structure that is based on a time long format;
receive, from a plurality of network devices, new time series data to potentially be stored in the compact prefix tree data structure;
convert a time stamp date and time parameter of the new time series data into a second time long value parameter;
determine whether a physical parameter of the new time series data is different than a corresponding physical parameter of the previously stored time series data in the compact prefix tree data structure; and
selectively store the new time series data in the compact prefix tree data structure based on whether the physical parameter of the new time series data is different than the corresponding physical parameter of the previously stored time series data in the compact prefix tree data structure,
the new time series data to be stored in the compact prefix tree data structure when the physical parameter of the new time series data is different than the corresponding physical parameter of the previously stored time series data in the compact prefix tree data structure, or
a last time stamp for one of the previously stored time series data to be updated, based on the new time series data, when the physical parameter of the new time series data matches the corresponding physical parameter of the one of the previously stored time series data.

9. The non-transitory computer-readable medium of claim 8, where the one or more instructions, when executed by the one or more processors, further cause the one or more processors to:
receive, from a device, a request for particular time series data associated with a particular time period;
traverse the compact prefix tree data structure, based on the particular time period and the time long format, to retrieve the particular time series data; and
provide the particular time series data to the device.

10. The non-transitory computer-readable medium of claim 8, where the one or more instructions, when executed by the one or more processors, further cause the one or more processors to:
generate one or more statistics based on the previously stored time series data in the compact prefix tree data structure.

11. The non-transitory computer-readable medium of claim 8, where the one or more instructions, when executed by the one or more processors, further cause the one or more processors to:
generate one or more statistics based on the new time series data and the previously stored time series data in the compact prefix tree data structure.

12. The non-transitory computer-readable medium of claim 8, where the one or more instructions, when executed by the one or more processors, further cause the one or more processors to:
determine, when the physical parameter of the new time series data is different than the corresponding physical parameter of the previously stored time series data in the compact prefix tree data structure, whether a difference between the physical parameter of the new time series data and the corresponding physical parameter of the previously stored time series data satisfies a threshold; and
generate an alert when the difference between the physical parameter of the new time series data and the corresponding physical parameter of the previously stored time series data satisfies the threshold.

13. The non-transitory computer-readable medium of claim 8, where the physical parameter is a temperature parameter.

14. The non-transitory computer-readable medium of claim 8, where the new time series data includes a sequence of data points providing measurements over a time interval for a given metric associated with the plurality of network devices.

15. A method, comprising:
receiving, by a device, time series data from a plurality of network devices,
where the time series data includes time stamp date and time parameters;
converting, by the device, the time stamp date and time parameters into time long value parameters;
storing, by the device and based on the time long value parameters, the time series data in a compact prefix tree data structure;
receiving, by the device, new time series data to potentially be stored in the compact prefix tree data structure;
converting, by the device, a time stamp date and time parameter of the new time series data into a new time long value parameter;
determining, by the device, whether a physical parameter of the new time series data is different than a corresponding physical parameter of one of the previously stored time series data in the compact prefix tree data structure; and
selectively storing, by the device, the new time series data in the compact prefix tree data structure based on whether the physical parameter of the new time series data is different than the corresponding physical parameter of one of the previously stored time series data in the compact prefix tree data structure,
the new time series data to be stored in the compact prefix tree data structure when the physical parameter of the new time series data is different than the corresponding physical parameter of the one of the previously stored time series data in the compact prefix tree data structure, or
a last time stamp to be updated for one of the previously stored time series data, based on the new time series data, when the physical parameter of the new time series data matches the corresponding physical parameter of the one of the previously stored time series data.

16. The method of claim 15, further comprising:
receiving, from another device, a request for particular time series data associated with a particular time period;
traversing, by the device, the compact prefix tree data structure, based on the particular time period and the time long format, to retrieve the particular time series data; and
providing, by the device, the particular time series data to the other device.

17. The method of claim 15, further comprising:
  generating, by the device, one or more statistics based on the previously stored time series data in the compact prefix tree data structure.

18. The method of claim 15, further comprising:
  generating, by the device, one or more statistics based on the new time series data and the previously stored time series data in the compact prefix tree data structure.

19. The method of claim 15, further comprising:
  determining, by the device, when the physical parameter of the new time series data is different than the corresponding physical parameter of the one of the previously stored time series data in the compact prefix tree data structure, whether a difference between the physical parameter of the new time series data and the corresponding physical parameter of the one of the previously stored time series data satisfies a threshold; and
  generating, by the device, an alert when the difference between the physical parameter of the new time series data and the corresponding physical parameter of the one of the previously stored time series data satisfies the threshold.

20. The method of claim 15, where receiving the new time series data includes receiving the new time series data from one or more network devices associated with a network,
  where the physical parameter is a temperature parameter associated with at least one of the one or more network devices associated with the network.

\* \* \* \* \*